United States Patent
An et al.

(10) Patent No.: US 10,395,266 B2
(45) Date of Patent: Aug. 27, 2019

(54) SYSTEM AND METHOD FOR PROVIDING BENEFITS BASED ON MO SERVICE

(71) Applicant: SK PLANET CO., LTD., Gyeonggi-do (KR)

(72) Inventors: Jee Hyuk An, Seoul (KR); Se Kyu Maeng, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/316,777

(22) PCT Filed: Dec. 2, 2015

(86) PCT No.: PCT/KR2015/013015
§ 371 (c)(1),
(2) Date: Dec. 6, 2016

(87) PCT Pub. No.: WO2016/171361
PCT Pub. Date: Oct. 27, 2016

(65) Prior Publication Data
US 2018/0040013 A1 Feb. 8, 2018

(30) Foreign Application Priority Data
Apr. 23, 2015 (KR) .................. 10-2015-0057548

(51) Int. Cl.
*G06Q 30/02* (2012.01)
*H04H 20/72* (2008.01)
(Continued)

(52) U.S. Cl.
CPC ..... *G06Q 30/0217* (2013.01); *G06Q 30/0251* (2013.01); *H04H 20/72* (2013.01);
(Continued)

(58) Field of Classification Search
None
See application file for complete search history.

(56) References Cited

U.S. PATENT DOCUMENTS 4,882,675 A * 11/1989 Nichtberger ......... G06Q 20/387
705/14.35
2002/0159464 A1* 10/2002 Lewis ............... H04L 29/06027
370/401
(Continued)

FOREIGN PATENT DOCUMENTS

JP   2011-527794 A   11/2011
KR   10-2005-0066510 A   6/2005
(Continued)

*Primary Examiner* — Matthew T Sittner
(74) *Attorney, Agent, or Firm* — Fenwick & West LLP

(57) ABSTRACT

The present invention relates to a system and method for providing benefits based on MO service, and there is provided a benefit providing system based on MO service, the system including: a service apparatus for identifying, if an event participation message including a Message Oriented (MO) identification is received, broadcast contents corresponding to the MO identification, setting recommended benefit information based on the identified broadcast contents or corresponding user information, and creating a response message including a service connection address capable of connecting to the set recommended benefit information.

8 Claims, 5 Drawing Sheets

(51) Int. Cl.
- *H04H 20/86* (2008.01)
- *H04H 20/93* (2008.01)
- *H04H 20/95* (2008.01)
- *H04H 60/63* (2008.01)
- *G06Q 30/00* (2012.01)

(52) U.S. Cl.
CPC ............ *H04H 20/86* (2013.01); *H04H 20/93* (2013.01); *H04H 20/95* (2013.01); *H04H 60/63* (2013.01); *G06Q 30/0201* (2013.01); *H04H 2201/37* (2013.01); *H04H 2201/40* (2013.01)

(56) References Cited

U.S. PATENT DOCUMENTS

| | | | | |
|---|---|---|---|---|
| 2005/0072608 | A1* | 4/2005 | Johnston | H02P 25/092 180/65.245 |
| 2008/0033857 | A1* | 2/2008 | Moses | G06Q 20/342 705/35 |
| 2008/0065490 | A1* | 3/2008 | Novick | G06Q 30/02 705/14.26 |
| 2009/0076912 | A1* | 3/2009 | Rajan | G06Q 30/02 705/14.64 |
| 2009/0144139 | A1* | 6/2009 | Gaedcke | G06Q 30/00 705/14.69 |
| 2013/0027227 | A1* | 1/2013 | Nordstrom | G08G 1/202 340/990 |
| 2013/0275197 | A1* | 10/2013 | Thibedeau | G06Q 30/0225 705/14.26 |
| 2013/0311322 | A1* | 11/2013 | Potter | G06Q 50/12 705/26.7 |
| 2014/0019224 | A1* | 1/2014 | Acha | G06K 19/07707 705/14.38 |
| 2014/0180802 | A1* | 6/2014 | Boal | G06Q 30/0245 705/14.49 |
| 2014/0180826 | A1* | 6/2014 | Boal | G06Q 30/0245 705/14.66 |
| 2014/0297392 | A1* | 10/2014 | Moffitt | G06Q 30/0238 705/14.38 |
| 2014/0365353 | A1* | 12/2014 | Shvarts | G06Q 40/025 705/38 |
| 2015/0227928 | A1* | 8/2015 | Patel | G06Q 20/3823 705/71 |
| 2015/0371254 | A1* | 12/2015 | Pugh | G06O 30/0224 705/14.25 |
| 2016/0012465 | A1* | 1/2016 | Sharp | G06Q 20/18 705/14.17 |
| 2016/0292705 | A1* | 10/2016 | Ayzenshtat | G06Q 30/0204 |
| 2017/0032354 | A1* | 2/2017 | Tilahun | G06Q 20/3223 |
| 2017/0200137 | A1* | 7/2017 | Vilmont | G06Q 20/10 |
| 2017/0278138 | A1* | 9/2017 | Yoon | G06Q 30/0268 |
| 2018/0040013 | A1* | 2/2018 | An | G06Q 30/0217 |

FOREIGN PATENT DOCUMENTS

| | | |
|---|---|---|
| KR | 10-0640184 A | 10/2006 |
| KR | 10-2010-0030922 A | 3/2010 |
| KR | 10-2012-0105279 A | 9/2012 |
| KR | 10-2014-0012468 A | 2/2014 |
| KR | 10-2014-0077996 A | 6/2014 |

* cited by examiner (a)

(b)

(c)

(d)

(e)

(f)

SYSTEM AND METHOD FOR PROVIDING BENEFITS BASED ON MO SERVICE

CROSS-REFERENCE TO RELATED APPLICATIONS

The present application is a national phase of PCT Application No. PCT/KR2015/013015 filed on Dec. 2, 2015, which claims to Korea patent application No. 10-2015-0057548 filed on Apr. 23, 2015, which are incorporated herein by reference in their entireties.

TECHNICAL FIELD

The present invention relates to a system and method for providing benefits based on MO service, and more specifically, to a system and method for providing benefits based on MO service, which set, if an event participation message including a Message Oriented (MO) identification corresponding to specific broadcast contents is received, recommended benefit information based on corresponding broadcast contents or corresponding user information and return a response message including a URL capable of connecting to the set recommended benefit information.

BACKGROUND ART

As is well-known to everybody, Short Message Service (hereinafter, simply referred to as 'SMS') is a text messaging service transmitted using a cellular phone, and in Korea, this is a kind of mobile communication service capable of transmitting a message including up to 88 bytes, i.e., 80 to 90 English letters or 40 to 45 Korean characters.

Such an SMS message is generally transmitted from a cellular phone or a PC to another cellular phone. If a transmitter inputs a text message into his or her cellular phone and presses a transmit button, the text message is transferred to a Short Message Service Center (SMSC) by way of a base station and then arrives at a cellular phone of a receiver through a transmission channel. Finally, if the cellular phone of the receiver replies to the base station that it has received the text message, transmission of the SMS is completely finished.

Since such an SMS may transmit the same message to a plurality of receivers, it is frequently used for public relations or marketing of a company, and companies having a large number of members may advantageously use the SMS to deliver product guides, events, announcements or the like.

Meanwhile, the SMS is originally a service for transmitting a text message from a cellular phone or a PC to another cellular phone. However, as time goes by, the text message can be transmitted to a PC or a server, not a cellular phone, and this is referred to as Message Oriented (MO) service.

The MO service is used in a variety of fields, such as broadcasting which needs real-time bidirectional communication with viewers, marketing developed as part of a marketing activity, dealing with customer service at a call center or a government office, an electric scoreboard in a stadium and the like.

Participating in an ARS quiz provided in a broadcast program, requesting music in a radio broadcast program, leaving a supporting message and the like are the examples of the MO service.

However, conventional MO service merely provides viewers with a way of participating in (e.g., voting for) a program of TV/radio or the like, and there is a limit in that the conventional MO service does not provide sufficient means for persuading viewers participating in a corresponding program as a customer of a product or a service.

DISCLOSURE OF INVENTION

Technical Problem

Therefore, the present invention has been made in view of the above problems, and it is an object of the present invention to provide a system and method for providing benefits based on MO service, which can provide benefits such as points/coupons/discounts or the like to a user participating in an event progressed in a broadcast program of TV/radio or the like.

Another object of the present invention is to provide a system and method for providing benefits based on MO service, which can provide additional points or the like to a user participating in an event of a broadcast program according to connection information on connecting to benefit information or benefit use information of the user.

Still another object of the present invention is to provide a system and method for providing benefits based on MO service, which can expect increase in revenue without separately placing an advertisement for target customers by advertising a product or a service of a broadcast program affiliate company to viewers voluntarily participating in the broadcast program.

Technical Solution

To accomplish the above objects, according to one aspect of the present invention, there is provided a benefit providing system based on MO service, the system including: a service apparatus for identifying, if an event participation message including a Message Oriented (MO) identification is received, broadcast contents corresponding to the MO identification, setting recommended benefit information based on the identified broadcast contents or corresponding user information, and creating a response message including a service connection address capable of connecting to the set recommended benefit information.

The benefit providing system based on MO service may further include a user terminal for transmitting the event participation message including the MO identification to the service apparatus, connecting to a benefit providing page through the service connection address included in the response message received from the service apparatus and receiving the recommended benefit information.

In addition, the benefit providing system based on MO service may further include an affiliate company terminal for transmitting a benefit registration request signal including at least one of identification information of an affiliate company, a benefit to be provided and a benefit exposure condition to the service apparatus to register benefit information of the corresponding affiliate company in the service apparatus. Here, the benefit may include an advertisement, an event, points, a coupon, a discount and an application for a product or a service sold by the affiliate company, and the benefit exposure condition includes broadcast contents which desire to expose the benefit or user information.

According to another aspect of the present invention, there is provided a service apparatus including: a communication unit for transmitting and receiving information to and from a user terminal; an identification unit for identifying, if an event participation message including an MO identification is received from the user terminal, broadcast contents corresponding to the MO identification; a benefit setting unit for setting recommended benefit information based on the identified broadcast contents or user information; and a response processing unit for creating a response message including a service connection address capable of connecting to the set recommended benefit information and transmitting the response message to the user terminal.

The service apparatus may further include: a benefit database; and a registration unit for receiving a benefit registration request signal including at least one of identification information of an affiliate company, a benefit to be provided and a benefit exposure condition from an affiliate company terminal and registering benefit information of the corresponding affiliate company in the benefit database.

The benefit setting unit may set at least one of benefits set to the identified broadcast contents, benefits of affiliate companies having a benefit exposure condition satisfying corresponding user information among affiliate companies supporting the identified broadcast contents, and benefits corresponding to preference information of the user among the benefits set to the identified broadcast contents as recommended benefit information.

In addition, the service apparatus may further include a history management unit for managing, if connection information on connecting to a benefit providing page or benefit use information is received from the user terminal, benefit history of a corresponding user.

In addition, the service apparatus may further include a broadcast contents database for storing broadcast contents identification information and an MO identification set for each broadcast contents, and the identification unit identifies broadcast contents corresponding to the MO identification by searching the broadcast contents database.

According to still another aspect of the present invention, there is provided a benefit providing method based on MO service, the method including the steps of: identifying, if an event participation message including an MO identification is received from a user terminal, broadcast contents corresponding to the MO identification, by a service apparatus; setting recommended benefit information based on the identified broadcast contents or user information, by the service apparatus; and creating a response message including a service connection address capable of connecting to the set recommended benefit information and transmitting the response message to the user terminal, by the service apparatus.

The benefit providing method based on MO service may further include the step of registering, if a benefit registration request signal including at least one of identification information of an affiliate company, a benefit to be provided and a benefit exposure condition is received from an affiliate company terminal, benefit information of the corresponding affiliate company, by the service apparatus.

The recommended benefit information may be set by at least one of benefits set to the identified broadcast contents, benefits of affiliate companies having a benefit exposure condition satisfying corresponding user information among affiliate companies supporting the identified broadcast contents, and benefits corresponding to preference information of the user among the benefits set to the identified broadcast contents.

Meanwhile, the 'system and method for providing benefits based on MO service' described above may be recorded in a recording medium that can be read by an electronic device or distributed through a program download management apparatus (a server or the like) after being implemented in the form of a program.

Advantageous Effects

According to the present invention, benefits such as points/coupons/discounts or the like for participating in an event may be provided to a user participating in the event provided by a broadcast program of TV/radio or the like.

In addition, points or the like may be additionally provided to a user participating in an event of a broadcast program based on connection information on connecting to benefit information or benefit use information of the user.

In addition, cost required for separately placing an advertisement for target customers can be saved and increase in revenue can be expected by advertising a product or a service of a broadcast program affiliate company to viewers voluntarily participating in the broadcast program.

In addition, if a viewer of a TV/radio program participates in an event provided by a corresponding program using his or her own terminal, the service apparatus transmits a response message including a URL of a specific Internet site to a terminal of the viewer, and thus benefits for participating in the program may be provided to the viewer, and accordingly, this may effectively lead to increase of revenue without consuming separate advertisement cost for a product or a service.

Meanwhile, the effects of the present invention are not limited to the effects mentioned above, and various effects may be included within a scope apparent to those skilled in the art from the descriptions described below.

DESCRIPTION OF SYMBOLS

Figure 1:
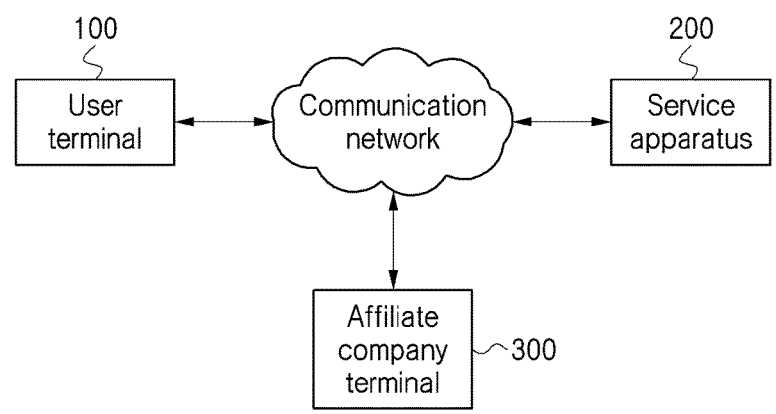
FIG. 1 is a view showing a benefit providing system based on MO service according to an embodiment of the present invention.

100: User terminal
110, 220: Communication unit
120: Input unit
130: Display unit
140: Storage unit
150: MO service participation processing unit
160, 280: Control unit
200: Service apparatus
230: Registration unit
240: Identification unit
250: Benefit setting unit
260: Response processing unit 270: History management unit
300: Affiliate company terminal unit

BEST MODE FOR CARRYING OUT THE INVENTION

Hereinafter, a 'System and method for providing benefits base on an MO service' according to the present invention will be described in detail with reference to the accompanying drawings. Embodiments to be described are provided in order for those skilled in the art to easily understand the technical spirit of the present invention, and the present invention is not restricted by the embodiments. Furthermore, contents represented in the accompanying drawings have been diagrammed in order to easily describe the embodiments of the present invention, and the contents may be different from drawing forms that are actually implemented.

Elements to be described herein are only examples for implementing the embodiments of the present invention. Accordingly, in other implementations of the present invention, different elements may be used without departing from the spirit and scope of the present invention.

Furthermore, each of the elements may be purely implemented using a hardware or software element, but may be implemented using a combination of various hardware and software elements that perform the same function. Furthermore, two or more elements may be implemented together by a piece of hardware or software.

Furthermore, an expression that some elements are "included" is an expression of an "open type", and the expression simply denotes that the corresponding elements are present, but should not be construed as excluding additional elements.

FIG. 1 is a view showing a benefit providing system based on MO service according to an embodiment of the present invention.

Referring to FIG. 1, a benefit providing system based on MO service includes a user terminal 100, a service apparatus 200 and an affiliate company terminal 300, and these components may transmit and receive data through a communication network.

The user terminal 100 transmits an event participation message including an MO identification to the service apparatus 200, connects to a benefit providing page through a service connection address included in a response message received from the service apparatus 200, and receives benefit information. Here, the service connection address may be a URL capable of connecting to recommended benefit information.

That is, a viewer watching broadcast contents transmits a vote, an opinion and the like of the user related to the broadcast contents that the user is watching to the service apparatus 200 using his or her terminal 100 as an SMS message including an MO identification, receives a callback URL of a specific Internet site from the service apparatus 200, and then receives various benefits (e.g., including advertisements, events, coupons and the like). Here, the broadcast contents may be a broadcast program of TV, radio or the like.

The user may be a viewer watching the broadcast contents, and the user terminal 100 is a device supporting an MO service and can be an electronic device such as a smart phone, a tablet, a PC, a notebook computer, a PDA or the like, and other than this, it can be implemented in the form of various electronic devices capable of performing an arithmetic operation or a data transmission and reception operation.

The affiliate company terminal 300 registers a service connection address (i.e., a URL), which provides information on a product or a service that the affiliate company desires to advertise or sell, in the service apparatus 200. Here, the affiliate company may be a company supporting the broadcast contents, and the affiliate company terminal 300 may be a device provided in a company supporting the broadcast contents.

The affiliate company terminal 300 transmits a benefit registration request signal including at least one of identification information of an affiliate company, a benefit to be provided and a benefit exposure condition to the service apparatus 200 to register benefit information of the corresponding affiliate company in the service apparatus 200. Here, the benefit includes an advertisement, an event, points, a coupon, a discount, an application and the like for a product or a service sold by the affiliate company, and the benefit exposure condition may include conditions such as broadcast contents which desire to expose the benefit and user information (e.g., a sex, an age, a region of residence and the like of the user).

Such an affiliate company terminal 300 is a device capable of registering the benefit information through a communication network and may be an electronic device such as a smart phone, a tablet, a PC, a notebook computer, a PDA or the like, and other than this, it can be implemented in the form of various electronic devices capable of performing an arithmetic operation or a data transmission and reception operation.

If the event participation message including an MO identification is received from the user terminal 100, the service apparatus 200 identifies broadcast contents corresponding to the MO identification and sets recommended benefit information based on the identified broadcast contents or corresponding user information.

At this point, the service apparatus 200 may set benefits set to the identified broadcast contents, benefits of affiliate companies having a benefit exposure condition satisfying corresponding user information among affiliate companies supporting the identified broadcast contents, benefits corresponding to preference information of the user among the benefits set to the identified broadcast contents and the like as recommended benefit information.

In addition, the service apparatus 200 may set a corresponding number of benefits as recommended benefit information according to a predetermined number, a number determined by the user, a number set for each broadcast contents or the like.

If the number of recommended benefits is set like this, the service apparatus 200 may set a priority on the benefits set to the broadcast contents based on preference information of the user, a connection rate, additional accumulation points, credit of an affiliate company and the like and set recommended benefit information starting from high priority. Here, the connection rate means a connection rate of the user for the benefit providing page, and the additional accumulation points may be points additionally accumulated thanks to use of a corresponding benefit, and the credit of an affiliate company may be a credibility set for each affiliate company based on sales of a product (or a service).

Then, the service apparatus 200 creates a response message including a URL capable of connecting to the set recommended benefit information and transmits the response message to the user terminal 100 in response to the event participation message. The response message may be a Short Message Service (SMS) message, a Long Message Server (LMS) message or a Multimedia Message Server (MMS) message and may include text, a still image, a moving image, a voice or the like.

The service apparatus 200 receives the benefit registration request signal including at least one of identification information of an affiliate company, a benefit to be provided and a benefit exposure condition from the affiliate company terminal 300 and registers benefit information of the corresponding affiliate company.

The service apparatus 200 is a server performing an MO service, which receives an event participation message including an MO identification, a caller identification and message contents from the user terminal 100.

The MO service is used in a variety of fields, such as broadcasting which needs real-time bidirectional communication with viewers, marketing developed as part of a marketing activity, dealing with customer service at a call center or a government office, an electric scoreboard in a stadium and the like.

For example, participating in an ARS quiz provided in a broadcast program, requesting music in a radio broadcast program, leaving a supporting message and the like are the MO service.

Although it is not shown in the figures, a contents providing apparatus (not shown) which provides broadcast contents may define in advance an MO identification (e.g., #1234) for the MO service and expose the MO identification in each broadcast contents.

Meanwhile, the service apparatus 200 may be implemented as a single computing device or in the form of an aggregated device connecting two or more computing devices to each other. For example, the service apparatus 200 may be implemented as a single server or in a form connecting two or more servers to each other.

Figure 2:
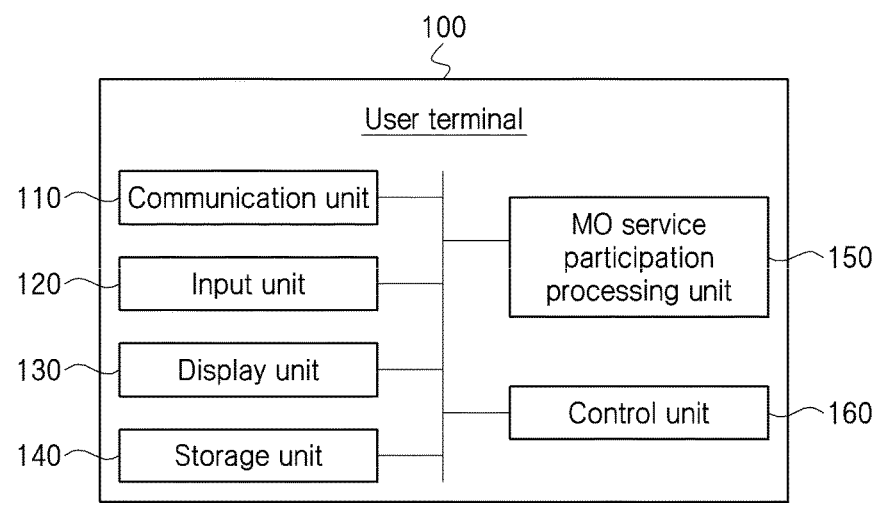
FIG. 2 is a block diagram schematically showing the configuration of a user terminal according to an embodiment of the present invention.

FIG. 2 is a block diagram schematically showing the configuration of a user terminal according to an embodiment of the present invention.

Referring to FIG. 2, the user terminal 100 includes a communication unit 110 for transmitting and receiving data to and from various electronic devices, an input unit 120, a display unit 130, a storage unit 140, an MO service participation processing unit 150 and a control unit 160.

The communication unit 110 is a component for transmitting and receiving data to and from various electronic devices.

Specifically, the communication unit 110 may be connected to the user terminal 100 and the service apparatus 200 through a wired or wireless communication network, and transmit and receive various data including an event participation message, a response message and the like based on the connection.

Such a communication unit 110 may include various wired or wireless communication modules and transmit or receive data based on various wired or wireless communication specifications. For example, the communication unit 110 may be implemented in a form including various standard communication modules conforming to ITU, IEEE, ISO, IEC or the like or may be implemented in a form including various communication modules other than the standard communication modules.

The input unit 120 is a component for receiving information from the user and, particularly, may be used to input an MO identification such as "#1234" or the like, whether or not to participate in an event or the like.

Meanwhile, the input unit 120 may be implemented as an input device such as a keypad, a touch panel or the like, and other than such an input device, it can be implemented as a variety of input devices. In addition, the input unit 120 may be implemented in the form of a touch screen configured in one body together with the display unit 130.

The display unit 130 is a component for displaying various information related to the operation of the terminal 100, which may display various information such as a response message for an event participation message, benefit information and the like. The display unit 130 may be implemented through various display devices including an LCD, an LED and the like.

The storage unit 140 is a component for storing data related to the operation of the terminal 100. For example, the storage unit 140 may store various data including an application for the MO service, a data for implementing a UI, a data transferred through the communication unit 110, a data input through the input unit 120 and the like.

Such a storage unit 140 may be implemented to include various kinds of memory devices.

The MO service participation processing unit 150 transmits an event participation message including an MO identification to the service apparatus through the communication unit 110, connects to a benefit providing page through a URL included in the response message received from the service apparatus, and receives recommended benefit information.

That is, if participation in an event is induced while watching broadcast contents, the user inputs an MO identification defined for the broadcast contents and inputs details of participation in the event. The MO service participation processing unit 150 transmits a text message including the details of participation in the event, the MO identification and the like to the service apparatus and receives a response message for the participation in the event from the service apparatus. Here, the response message includes details of a response to the participation in the event, a URL capable of directly connecting to recommended benefit information and the like. Accordingly, the user may connect to a benefit providing page through the URL included in the response message and receive recommended benefit information.

If the user connects to the benefit providing page through the URL included in the response message, the MO service participation processing unit 150 may transmit connection information thereof to the service apparatus. Here, the connection information may include user identification information, a connected URL and the like.

In addition, if benefits are received through the benefit providing page, the MO service participation processing unit 150 may transmit benefit use information to the service apparatus. Here, the benefit use information may include a used benefit, a date of using the benefit, user identification information and the like.

Meanwhile, the MO service participation processing unit 150 may be implemented by a processor or the like needed to execute a program on a computing device.

Like this, the MO service participation processing unit 150 may be implemented by a physically independent individual component or may be implemented in a form functionally distinguished within a processor.

The control unit 160 is a component for controlling operation of various components of the terminal 100 and including the communication unit 110, the input unit 120, the display unit 130, the storage unit 140 and the MO service participation processing unit 150.

Such a control unit 160 is a means for issuing a specific command to each component so that the component may operate in an original function, which can be implemented by a processor or the like capable of processing data. The control unit 160 may include at least one computing device, and here, the computing device may be a general-purpose central processing unit (CPU), a programmable device element (CPLD or FPGA) implemented to be suitable for a specific purpose, an application specific integrated circuit (ASIC) or a microcontroller chip.

Figure 3:
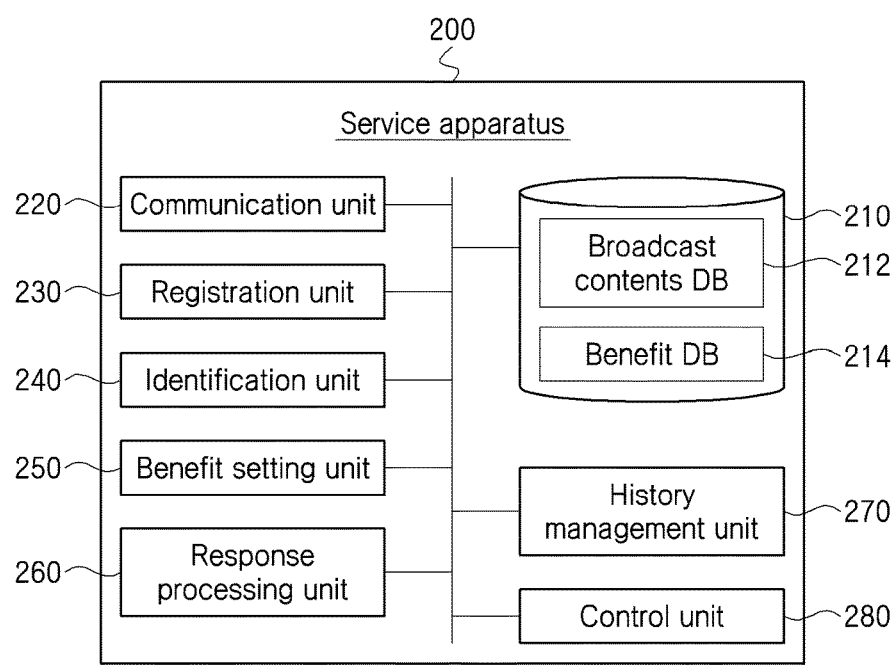
FIG. 3 is a block diagram schematically showing the configuration of a service apparatus according to an embodiment of the present invention.

FIG. 3 is a block diagram schematically showing the configuration of a service apparatus according to an embodiment of the present invention.

Referring to FIG. 3, the service apparatus 200 includes a database 210, a communication unit 220, a registration unit 230, an identification unit 240, a benefit setting unit 250, a response processing unit 260, a history management unit 270 and a control unit 280.

The database 210 includes a broadcast contents database 212 and a benefit database 214.

The broadcast contents database 212 stores broadcast contents identification information, an MO identification set for each broadcast contents and the like. The MO identification set for each broadcast contents may be information received from a broadcasting center which transmits corresponding broadcast contents.

The benefit database 214 stores identification information of an affiliate company, benefits provided by the affiliate company, a benefit exposure condition for exposing each of the benefits and the like. Here, the benefit may include an advertisement, an event, points, a coupon, a discount, an application and the like for a product or a service sold by the affiliate company, and the benefit exposure condition may include broadcast contents which desire to expose the benefit, user information (e.g., a sex, an age, and a region of residence) and the like.

Each of the benefits and the benefit exposure condition mapped to the identification information of a corresponding affiliate company or each of the benefits mapped to the broadcast contents identification information may be stored in the benefit database 214.

The broadcast contents database 212 and the benefit database 214 are positioned in the service apparatus 200 or in a network associated with the service apparatus 200, and in some cases, some of the constitutional components of the database may be separately mounted on a local server, and this also belongs to the scope of the present invention.

The communication unit 220 is a component for transmitting and receiving data to and from various electronic devices. Particularly, the communication unit 220 may be connected to two or more terminals and transmit and receive various information such as an event participation message, a response message, benefit information and the like.

If registration of benefit information is requested from the affiliate company terminal, the registration unit 230 registers corresponding benefit information in the benefit database 214.

That is, if a benefit registration request signal including at least one of identification information of an affiliate company, a benefit to be provided and a benefit exposure condition is received, the registration unit 230 maps the benefit and the benefit exposure condition to the identification information of the affiliate company and registers mapped data in the benefit database 214.

In addition, if a benefit registration request signal including at least one of identification information of an affiliate company, a benefit to be provided and a benefit exposure condition is received, the registration unit 230 maps the benefit and the benefit exposure condition to the broadcast contents identification information and registers mapped data in the benefit database 214.

If an event participation message including an MO identification is received from the user terminal, the identification unit 240 identifies broadcast contents corresponding to the MO identification. That is, the identification unit 240 extracts the MO identification, user identification information and the like by analyzing the event participation message and identifies broadcast contents corresponding to the MO identification extracted from the broadcast contents database 212. Here, the user identification information may include a user terminal number, a user ID and the like.

The identification unit 240 transmits details of participation in the event to a broadcasting center which manages the identified broadcast contents.

In addition, the identification unit 240 may acquire user information (e.g., a sex, an age, a region of residence and the like) corresponding to the user identification information from a user information database (not shown) provided inside or outside the service apparatus 200.

That is, if the user information database in which the user information is registered is provided in the service apparatus, the identification unit 240 may acquire user information from the user information database provided in the service apparatus 200.

If the user information database is not provided in the service apparatus, the identification unit 240 may request and receive user information of a corresponding user from a communication company or the like.

The benefit setting unit 250 sets recommended benefit information based on the identified broadcast contents or the user information.

That is, the benefit setting unit 250 extracts benefits from the benefit database 214 based on the user information including at least one of the age, sex, preference information and position of the user or the broadcast contents and sets the extracted benefits as recommended benefit information.

For example, if participating broadcast contents are first music contents, the benefit setting unit 250 may set benefits related to the first music contents, benefits provided by an affiliate company supporting the first music contents or the like as recommended benefit information.

In addition, the benefit setting unit 250 may set benefit information that can be serviced within a region of residence of a corresponding user as recommended benefit information.

In addition, the benefit setting unit 250 may set benefit information of an affiliate company preferred by a corresponding user as recommended benefit information.

The benefit setting unit 250 confirms affiliate companies supporting the broadcast contents identified from the benefit database 214 and acquires benefit exposure conditions of the affiliate companies. Then, the benefit setting unit 250 compares the acquired benefit exposure conditions with the user information, selects affiliate companies having a benefit exposure condition satisfying the user information, and sets benefit information of the selected affiliate companies as recommended benefit information.

For example, it will be described assuming that the participating broadcast contents are first music broadcast contents, the benefit exposure condition of a first affiliate company supporting the first music broadcast contents is set to "women in their twenties living in Seoul", the benefit exposure condition of a second affiliate company is set to "people in their twenties to forties", and the user is set to "women in their thirties living in Incheon". In this case, since the user satisfies the benefit exposure condition of the second affiliate company, the benefit setting unit 250 sets the benefits of the second affiliate company as recommended benefit information.

In addition, if the service apparatus 200 is provided with a user information database (not shown), the benefit setting unit 250 may confirm preference information of a corresponding user by searching the user information database and set benefits corresponding to the preference information of the user among the benefits set to corresponding broadcast contents as recommended benefit information. Here, user identification information (terminal identification information or the like), preferred affiliate companies, preferred information such as the types of preferred benefits and the like are stored in the user information database.

Like this, the benefit setting unit 250 may set at least one of benefits set to the identified broadcast contents, benefits of affiliate companies having a benefit exposure condition satisfying corresponding user information among affiliate companies supporting the identified broadcast contents, benefits corresponding to preference information of the user among the benefits set to the identified broadcast contents and the like as recommended benefit information.

In addition, the benefit setting unit 250 may set a corresponding number of benefits as recommended benefit information according to a predetermined number, a number determined by the user, a number set for each broadcast contents or the like.

If the number of recommended benefits is set, the benefit setting unit 250 may set a priority on the benefits extracted from the benefit database 214 based on the preference information of the user, a connection rate, additional accumulation points, credit of an affiliate company and the like and set recommended benefit information starting from high priority.

For example, if the preferred foods of the user are in order of "Bakery, Pizza and Chicken" and the extracted benefits are "Discount coupon of bakery A", "Free app of game B" and "Free beverage with purchase of pizza C", the benefit setting unit 250 may create a recommended benefit list in order of "Discount coupon of bakery A", "Free beverage with purchase of pizza C" and "Free app of game B" according to the preference information of the user and set the list as recommended benefit information.

In addition, if the connection rates of the extracted benefits are in order of "Free app of game B", "Discount coupon of bakery A" and "Free beverage with purchase of pizza C", the benefit setting unit 250 may create a recommended benefit list in order of "Free app of game B", "Discount coupon of bakery A" and "Free beverage with purchase of pizza C" and set the list as recommended benefit information.

In addition, if the additional accumulation points of the extracted benefits are high in order of "Discount coupon of bakery A", "Free app of game B" and "Free beverage with purchase of pizza C", the benefit setting unit 250 may create a recommended benefit list in order of "Discount coupon of bakery A", "Free app of game B" and "Free beverage with purchase of pizza C" and set the list as recommended benefit information.

The response processing unit 260 creates a response message including a URL capable of connecting to the recommended benefit information set by the benefit setting unit 250 and transmits the response message to the user terminal.

That is, the response processing unit 260 creates a response message including a response to the participation in the event, a URL capable of directly connecting to the recommended benefit information and the like and transmits the created response message to the user terminal. Here, since the recommended benefit information is different from user to user, the URL capable of directly connecting to the recommended benefit information may be information different from user to user.

The response processing unit 260 creates a response message by setting a service connection address from which benefit information can be provided as a callback uniform resource locator (URL) address and transmits the created response message to the user terminal. At this point, the user terminal may directly connect to a site which provides the benefit information through the service connection address of the response message and use the benefit information provided by the corresponding site through the connection.

That is, if the user has an intention of using or purchasing the benefits supplied by the affiliate companies supporting the broadcast contents, the user terminal may connect to a benefit providing site through the service connection address included in the response message. At this point, the user terminal may transfer connection information thereof to the service apparatus 200. The recommended benefit list or the like can be displayed on the benefit providing site.

Although it is described above that the URL capable of directly connecting to the recommended benefit information is different from user to user, the URL capable of directly connecting to the recommended benefit information may not be different from user to user, but the same for all users.

In this case, if the user connects to the URL, user authentication may be requested, and recommended benefit information may be provided to the authenticated user. At this point, the user authentication may be performed using an authentication number, a password, an IPIN or the like, and if the user is an authenticated user, the set recommended benefit information may be provided to the user.

If connection information on connecting to the benefit providing page or benefit use information is received from the user terminal, the history management unit 270 manages benefit history of a corresponding user. Here, the benefit history may include a used benefit, a date of using the benefit, accumulated points and the like.

The history management unit 270 may calculate a connection rate of the user for the benefit providing page using the connection information transferred from the user terminal and create statistics on the connection rate.

If a benefit provided through the benefit providing page is used, the history management unit 270 may additionally accumulate points for using the benefit.

For example, if the user selects a specific event from the recommended benefit list displayed on the benefit providing page, the history management unit 270 may accumulate points for participating in the event. In addition, if the user uses a specific coupon from the recommended benefit list displayed on the benefit providing page, the history management unit 270 may accumulate points for using the coupon.

In addition, the history management unit 270 may perform a function of creating statistics on a response rate of the user for each affiliate company or for each benefit using the connection information transferred from the user terminal 110. At this point, the response rate may mean the number of actual connections in contrast to the number of transmissions of the response message including the recommended benefit information. That is, the history management unit 270 may receive the connection information and calculate the connection rate for the benefits of each affiliate company and may use the calculated connection rate diversely.

Meanwhile, each of the registration unit 230, the identification unit 240, the benefit setting unit 250, the response processing unit 260 and the history management unit 270 may be implemented by a processor or the like needed to execute a program on a computing device. Like this, the registration unit 230, the identification unit 240, the benefit setting unit 250, the response processing unit 260 and the history management unit 270 may be implemented by a physically independent individual component or may be implemented in a form functionally distinguished within a processor.

The control unit 280 is a component for controlling operation of various components of the service apparatus 200, including the database 210, the communication unit 220, the registration unit 230, the identification unit 240, the benefit setting unit 250, the response processing unit 260 and the history management unit 270.

Such a control unit 280 is a component for issuing a specific command to each component so that the component may operate in an original function, which can be implemented by a processor or the like capable of processing data or by different processors separated from each other, or may be functionally separated within a processor. The control unit 280 may include at least one computing device, and, here, the computing device may be a general-purpose central processing unit (CPU), a programmable device element (CPLD or FPGA) implemented to be suitable for a specific purpose, an application specific integrated circuit (ASIC) or a microcontroller chip.

Figure 4:
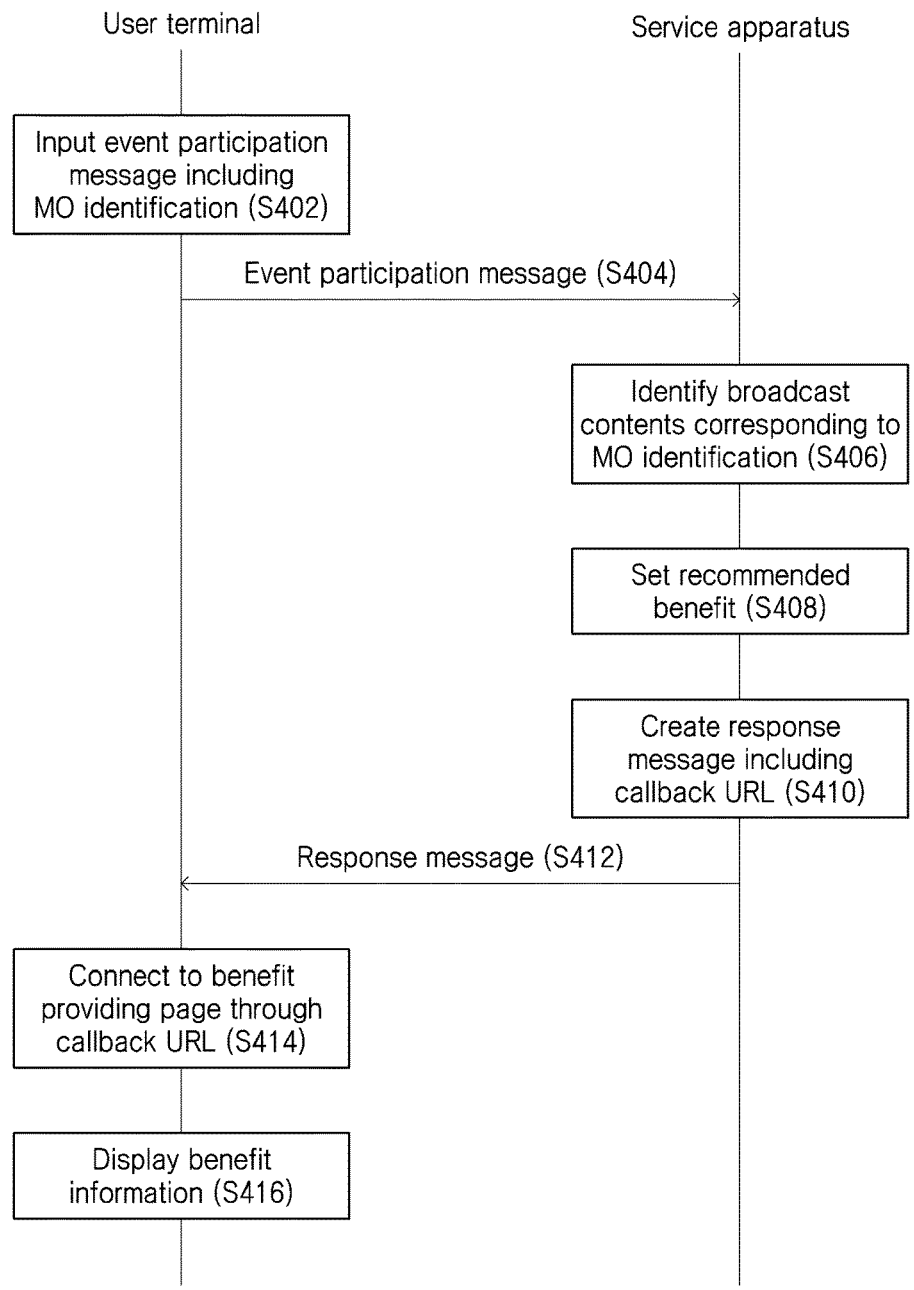
FIG. 4 is a view showing a benefit providing method based on MO service according to an embodiment of the present invention.
Figure 5:
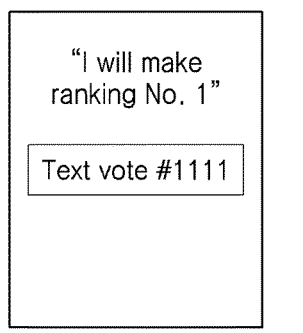
FIG. 5 is an exemplary view illustrating a benefit providing method based on MO service according to an embodiment of the present invention.
Figure 5:
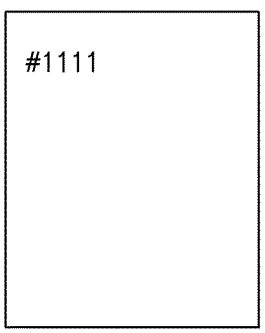
Figure 5:
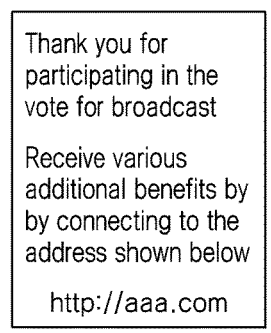
Figure 5:
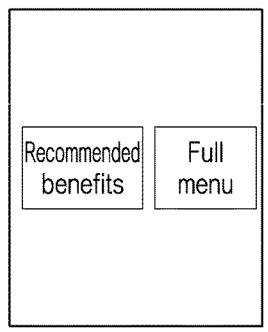
Figure 5:
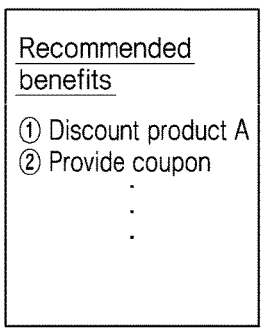
Figure 5:
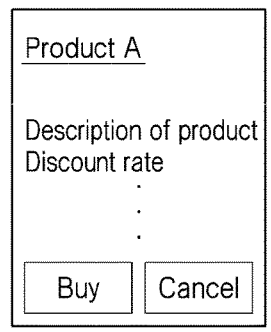

FIG. 4 is a view showing a benefit providing method based on MO service according to an embodiment of the present invention, and FIG. 5 is an exemplary view illustrating a benefit providing method based on MO service according to an embodiment of the present invention.

Referring to FIG. 4, if a user watching broadcast contents inputs an event participation message including an MO identification (step S402), the user terminal transmits the event participation message to the service apparatus (step S404).

The service apparatus identifies broadcast contents corresponding to the MO identification by analyzing the event participation message (step S406) and sets recommended benefit information based on the identified broadcast contents or user information (step S408).

At this point, the service apparatus may set benefit information set to the identified broadcast contents as recommended benefit information.

In addition, the service apparatus may compare benefit exposure conditions of affiliate companies supporting the identified broadcast contents with the user information and set benefit information of affiliate companies having a benefit exposure condition satisfying the user information as recommended benefit information.

In addition, the service apparatus may set benefits corresponding to preference information of the user among the benefits set to the identified broadcast contents as recommended benefit information.

Meanwhile, if the number of recommended benefits is set, the service apparatus may set a priority on the extracted benefits based on the broadcast contents or the user information based on the preference information of the user, a connection rate, additional accumulation points, credit of an affiliate company and the like and set recommended benefit information starting from high priority.

The service apparatus may transmit details of participation in the event to a broadcasting center which manages the identified broadcast contents and acquire user information (e.g., a sex, an age, a region of residence and the like) corresponding to the user identification information.

Then, the service apparatus creates a response message including a URL for the set recommended benefit information (step S410) and transmits the response message to the user terminal (step S412).

The user terminal connects to a benefit providing page through the URL included in the response message (step S414) and receives the recommended benefit information (step S416).

At this point, the user terminal may transmit connection information on connecting to the benefit providing page to the service apparatus. In addition, if benefit information is received through the connected benefit providing page, the user terminal may transmit benefit use information to the service apparatus.

Then, the service apparatus manages benefit use history of the user based on the connection information and the benefit use information. Here, the benefit use history may include a used benefit, a date of using the benefit, accumulated points and the like.

A method of providing benefits based on MO service will be described in detail with reference to FIG. 5.

Referring to FIG. 5, if a user is persuaded to participate in text messaging by the exposure of "#1111" while watching broadcast program A (a), the user inputs "#1111" set to the broadcast program A and inputs details of the text messaging (b).

Then, the user terminal transmits an event participation message including "#1111+ details of text messaging" to the service apparatus.

The service apparatus identifies broadcast program A corresponding to "#1111" by analyzing the event participation message and creates a response message including details of the response to the identified broadcast program A and a URL for benefit information.

Then, the service apparatus transmits the response message to the user terminal in response to participation of the user in the event.

Then, a response message such as "Thank you for participating in the vote for broadcast program A. Receive various additional benefits by connecting to the address shown below. http://aaa.com" is displayed on the user terminal (c).

The user connects to a benefit providing page through http://aaa.com displayed on the user terminal (d).

A recommended benefit menu and a full menu are displayed on the benefit providing page. A recommended benefit list including benefits set to the broadcast program A, benefits of affiliate companies set according to user information and the like may be displayed in the recommended benefit menu, and a predetermined number of recommended benefits may be displayed in the recommended benefit list.

For example, if the user selects the recommended benefit menu from the benefit providing page, a recommended benefit list including "Discount of product A", "Provide a coupon" and the like is displayed on the user terminal (e).

If the user selects a desired benefit from the recommended benefit list, the user terminal displays a detailed page of the selected benefit.

For example, if the user selects "Discount of product A" from the recommended benefit menu, the user terminal displays a detailed page of the Discount of product A (f).

If the user makes a purchase after confirming the detailed description on the "Discount of product A", additional points for purchasing the product are accumulated for the user.

If the user selects a recommended event from the recommended benefit menu, detailed information on the corresponding event is provided, and if the user participates in the event, points for participating in the event are accumulated. In addition, if the user selects a specific coupon from the recommended benefit menu, detailed information on the specific coupon is provided, and if the user downloads the specific coupon, points are accumulated.

The user terminal transmits benefit use information informing that a benefit has been used to the service apparatus. Then, the service apparatus manages benefit use history of the user. Here, the benefit use history may include a used benefit, a date of using the benefit, accumulated points and the like.

Figure 6:
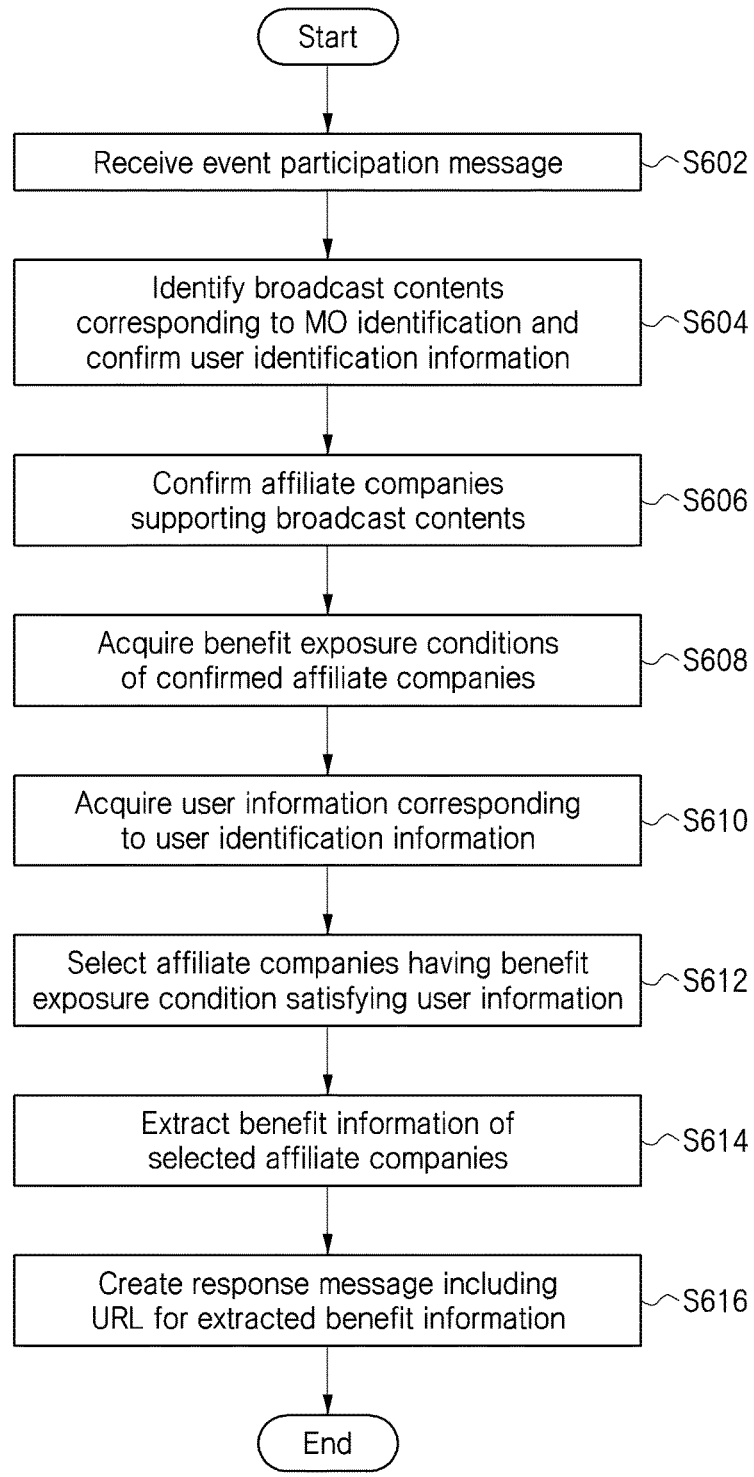
FIG. 6 is a flowchart illustrating a method of providing benefits based on MO service by a service apparatus according to an embodiment of the present invention.

FIG. 6 is a flowchart illustrating a method of providing benefits based on MO service by a service apparatus according to an embodiment of the present invention.

Referring to FIG. 6, if an event participation message including an MO identification is received (step S602), the service apparatus identifies broadcast contents corresponding to the MO identification and user identification information by analyzing the event participation message (step S604).

Then, the service apparatus confirms affiliate companies supporting the identified broadcast contents (step S606) and acquires benefit exposure conditions of the confirmed affiliate companies (step S608).

The service apparatus acquires user information corresponding to the user identification information (step S610) and selects affiliate companies having a benefit exposure condition satisfying the user information by comparing the acquired benefit exposure conditions with the user information (step S612).

Then, the service apparatus extracts benefits of the selected affiliate companies (step S614) and creates a response message including a URL for the extracted benefits (step S616).

At this point, if the number of recommended benefits is set, the service apparatus sets a priority on the extracted benefits based on preference information of the user, a connection rate, additional accumulation points, credit of an affiliate company and the like, arranges the extracted benefits in order of the priority and selects a predetermined number of benefits.

Then, the service apparatus sets the selected benefits as recommended benefit information and creates a URL capable of directly connecting to the recommended benefit information.

Then, the service apparatus creates a response message including details of a response to participation in the event, a URL capable of directly connecting to the recommended benefit information and the like and transmits the response message to the user terminal.

Then, the user may connect to a benefit providing page through the URL included in the response message and receive recommended benefit information, and if the user uses the recommended benefit information, points may be additionally accumulated.

Meanwhile, the benefit providing method based on MO service of the present invention can be implemented by a computer-readable medium or a terminal-readable medium. The computer-readable medium may be a certain available medium that can be accessed by a computer and includes all volatile and non-volatile media and removable and non-removable media.

In addition, the computer-readable medium may include all computer storage media and communication media. The computer storage medium includes all volatile and non-volatile media and removable and non-removable media implemented in a certain method or technique for storing information such as computer readable instructions, data structures, program modules or other data.

The communication medium typically includes computer readable instructions, data structures, program modules, other data of a modulated data signal such as a carrier wave, or other transmission mechanisms, and if the communication medium includes a certain information transfer medium, it is included in the service apparatus of the present invention.

The terminal-readable medium may be a certain available medium that can be accessed by a terminal and includes all volatile and non-volatile media and removable and non-removable media. In addition, the terminal-readable medium may include all terminal storage media and communication media.

In addition, according to another aspect of the present invention, there is provided a recording medium that can be read by an electronic device, in which the benefit providing method based on MO service is recorded in the form of a program, and the benefit providing method based on MO service includes the steps of, when the benefit providing method is executed by the service apparatus, identifying, if an event participation message including an MO identification is received from a user terminal, broadcast contents corresponding to the MO identification, by a service apparatus; setting recommended benefit information based on the identified broadcast contents or user information, by the service apparatus; and creating a response message including a service connection address capable of connecting to the set recommended benefit information and transmitting the response message to the user terminal, by the service apparatus.

The benefit providing method based on MO service can be created as a computer program, and codes and code segments constituting the computer program may be easily reasoned by a programmer in the art. In addition, the program related to the benefit providing method based on MO service is stored in an information storage medium that can be read by an electronic device and can be read and executed by the electronic device.

As described above, those skilled in the art to which the present invention pertains will appreciate that the present invention may be implemented in other detailed forms without changing the technical spirit or essential characteristic of the present invention. Accordingly, it is to be understood that the aforementioned embodiments are only illustrative, but are not limiting or restrictive. Furthermore, the flowcharts shown in the drawings are merely sequential order illustrated to achieve the most preferred results in implementing the present invention, and other additional steps may be provided or some of the steps may be deleted.

Technological characteristics described in this specification and an implementation for executing the technological characteristics may be implemented using a digital electronic circuit, may be implemented using computer software, firmware or hardware including the structure described in this specification and structural equivalents thereof, or may be implemented using a combination of one or more of them. Furthermore, the implementation for executing the technological characteristics described in this specification may be implemented using a computer program product, that is, a module regarding computer program instructions encoded on a kind of program storage media in order to control the operation of a processing system or for execution by the processing system.

A computer-readable medium may be a machine-readable storage device, a machine-readable storage substrate, a memory device, a composition of materials that affect a machine-readable electromagnetic signal or a combination of one or more of them.

In this specification, the terms "apparatus" or "system" cover all apparatuses, devices, and machines for processing data, for example, including a processor, a computer or a multi-processor, or a computer. The processing system may include, for example, code that forms processor firmware, a protocol stack, a database management system, an operating system, or all types of code that form an execution environment for a computer program when a combination of one or more of them is requested, in addition to hardware.

A computer program also known as a program, software, a software application, a script or code may be written in any form of a programming language which includes a compiled or interpreted language or a transcendental and/or procedural language, and may also be implemented in any form including an independent program or module, a component, a subroutine or other units suitable for being used in a computer environment.

The computer program does not need to necessarily correspond to a file of a file system. The program may be stored in a single file provided to a requested program, multiple files that interact with each other (e.g., a file that stores one or more modules, a lower program or part of code), or another program or part of a file including data (e.g., one or more scripts stored in markup language document).

The computer program may be placed in a single site or distributed to a plurality of sites and may be implemented to be executed on multiple computers or one or more computers interconnected over wired/wireless communication networks.

A computer-readable medium suitable for storing computer program instructions and data may include semiconductor memory devices, such as EPROM, EEPROM, and a flash memory device, for example, all types of non-volatile memory, media, and memory devices including magnetic disks, such as an internal hard disk or an external disk, magneto optical disks, CDs, and DVDs. The processor and the memory may be supplemented by a logic circuit for a special object or may be integrated into the logic circuit for a special object.

An implementation for executing the subject matter described in this specification may be implemented in an operation system including a backend component, such as a data server, a middleware component, such as an application server, a frontend component, such as a client computer having a web browser or graphic user interface capable of interacting with the implementation of the subject matter described by a user in this specification or all combinations of one or more of the backend, middleware, and frontend components. The component of the system may be accessed by any type or medium for digital data communication, such as a communication network.

Hereinafter, a more detailed embodiment capable of implementing the elements included in the system and method for providing benefits based on MO service, described in this specification, along with the aforementioned contents is described in detail.

The system and method for providing benefits based on MO service, which have been described in this specification, may be used partially or generally through a server related to a client device or web-based storage system or means for executing computer software, program code or instructions on one or more processors included in a server. In this case, the processor may be part of a server, a client, network infrastructure, or a computing platform, such as a mobile computing platform or fixed computing platform. More specifically, the processor may be a kind of computer or processing device capable of executing program instructions, code, etc. Furthermore, the processor may further include memory for storing the method, instructions, code or program for providing benefits based on MO service. If memory is not included in the processor, the processor may access a storage device, such as CD-ROM, DVD, memory, a hard disk, a flash drive, RAM, ROM, or a cache in which the method, instructions, code or program for providing benefits based on MO service is stored, through a separate interface.

Furthermore, the system and method for providing benefits based on MO service, which have been described in this specification, may be used partially or generally through an apparatus for executing computer software on a server, a client, a gateway, a hub, a router or network hardware. In this case, the software may be executed in various types of servers, such as a file server, a print server, a domain server, an Internet server, an intranet server, a host server, and a distributed server. The aforementioned servers may further include memory, a processor, a computer-readable storage medium, a storage medium, a communication device, a port, a client, and an interface capable of accessing other servers over wired/wireless networks.

Furthermore, the method, instructions, or code for providing benefits based on MO service may also be executed by a server. Other devices required to execute the method for providing benefits based on MO service may be implemented as part of a hierarchical structure associated with the server.

Furthermore, the server may provide an interface to other devices including a client, another server, a printer, a database server, a print server, a file server, communication a server, and a distributed server without limitation. A connection through the interface may enable a program to be easily executed at a remote place over wired/wireless networks.

Furthermore, any one of devices connected to the server through the interface may further include at least one storage device capable of storing the method, instructions or code for providing benefits based on MO service. The central processor of the server may provide instructions, code, etc. to be executed on another device to the device so that the instructions, code, etc. are stored in a storage device.

The system and method for providing benefits based on MO service, which have been described in this specification, may be used partially or generally through network infrastructure. In this case, the network infrastructure may include all of devices, such as a computing device, a server, a router, a hub, a firewall, a client, a personal computer, a communication device, and a routing device, and separate modules capable of executing respective functions. The network infrastructure may further include storage media, such as story flash memory, a buffer, a stack, RAM, and ROM, in addition to the aforementioned devices and module. Furthermore, the method, instructions or code for providing benefits based on MO service may also be executed by and stored in any one of the device, module, and storage medium included in the network infrastructure. Another device required to execute the method for providing benefits based on MO service may also be implemented as part of the network infrastructure.

Furthermore, the system and method for providing benefits based on MO service, which have been described in this specification, may be implemented using hardware or a combination of hardware and software suitable for a particular application. In this case, the hardware includes all of general-purpose computer devices, such as a personal computer and a mobile communication terminal, and a business type specific computer device. The computer device may be implemented using a device, such as memory, a microprocessor, a microcontroller, a digital signal processor, an application-specific integrated circuit, a programmable gate array, programmable array logic or a combination of them.

The aforementioned computer software, instructions, code, etc. may be stored or accessed by a readable device. In this case, the readable device may include memory, such as a computer component including digital data used for computing for a specific time, semiconductor storage, such as RAM or ROM, permanent storage, such as an optical disk, high-capacity storage, such as a hard disk, a tape and a drum, optical storage, such as a CD or DVD, and network access type storage, such as flash memory, a floppy disk, a magnetic tape, a paper tape, an independent type RAM disk, high-capacity storage detachable from a computer, dynamic memory, static memory, variable storage, and cloud. In this case, the instructions, code, etc. include all of languages, such as data-oriented languages, such as SQL and dBase, system languages, such as C, Objective C, C++, and Assembly, architecture languages, such as Java and NET, and application languages, such as PHP, Ruby, Perl, and Python, but are not limited thereto. The instructions, code, etc. may include all of languages widely known to those skilled in the art to which the present invention pertains.

Furthermore, the "computer-readable medium" described in this specification includes all of media which contribute to the provision of instruction to a processor in order to execute a program. More specifically, the "computer-readable medium" includes non-volatile media, such as a data storage device, an optical disk and a magnetic disk, volatile media, such as dynamic memory, and transmission media, such as a coaxial cable, a copper wire and an optical fiber for sending data, but is not limited thereto.

The elements for executing the technical characteristics of the present invention included in the block diagrams and flowcharts shown in the accompanying drawings of this specification mean the logical boundary between the elements.

In accordance with software or hardware embodiments, however, the illustrated elements and functions thereof are executed in the form of an independent software module, a monolithic software structure, code, a service or a combination of them and are stored in a medium which is executable by a computer including a processor capable of executing stored program code and instructions to implement their functions. Accordingly, all of such embodiments should be construed as belonging to the scope of the present invention.

Accordingly, the accompanying drawings and technologies thereof describe the technical characteristics of the present invention, but should not be simply reasoned unless a specific array of software for implementing such technical characteristics is clearly described otherwise. That is, the aforementioned various embodiments may be present and may be partially modified while having the same technical characteristics as those of the present invention. Accordingly, such modified embodiments should be construed as belonging to the scope of the present invention.

Furthermore, the flowchart describes operations in the drawing in a specific sequence, but has been illustrated to obtain the most preferred results. It should not be understood that such operations must be executed or all the illustrated operations must be executed in the illustrated specific sequence or sequential order. In a specific case, multi-tasking and parallel processing may be advantageous. Furthermore, the separation of various system components in the aforementioned embodiments should not be construed as requesting such separation in all the embodiments. It should be understood that the aforementioned program components and systems may be integrated into a single software product or packaged into a multi-software product.

As described above, the detailed terms proposed in this specification are not intended to limit the present invention. Accordingly, although the present invention has been described in detail with reference to the aforementioned embodiments, those skilled in the art to which the present invention pertains may reconstruct, change and modify the embodiments without departing from the scope of the present invention.

The scope of the present invention is defined by the appended claims rather than the detailed description, and the present invention should be construed as covering all modifications or variations derived from the meaning and scope of the appended claims and their equivalents.

The invention claimed is:

1. A benefit providing system, the system comprising:
a service apparatus configured to:
identify broadcast contents corresponding to a Message Oriented (MO) identification in an event participation message received from a user terminal via a network,
set recommended benefit information for a user of the user terminal based on the identified broadcast contents or user information of the user,
generate a response message including a service connection address for accessing the set recommended benefit information, and
send the response message to the user terminal via the network; and
an affiliate company terminal configured to:
transmit a benefit registration request signal including at least one of identification information of an affiliate company, a benefit to be provided, and a benefit exposure condition to the service apparatus to register benefit information of the corresponding affiliate company in the service apparatus.

2. The system according to claim 1, further comprising a user terminal configured to:
transmit the event participation message including the MO identification to the service apparatus,
access a benefit providing page through the service connection address included in the response message received.

3. A service apparatus comprising:
a communication unit configured to communicate with a user terminal via a network;
an identification unit configured to identify a Message Oriented (MO) identification in an event participation message received from the user terminal, broadcast contents corresponding to the MO identification;

a benefit setting unit configured to set recommended benefit information for a user of the user terminal based on the identified broadcast contents or user information of the user;

a response processing unit configured to create a response message including a service connection address for connecting to the set recommended benefit information and transmit the response message to the user terminal;

a benefit database; and a registration unit configured to receive a benefit registration request signal including at least one of identification information of an affiliate company, a benefit to be provided, and a benefit exposure condition from an affiliate company terminal, the registration unit configured to register benefit information of the corresponding affiliate company in the benefit database.

4. The apparatus according to claim 3, wherein the benefit setting unit is configured to set at least one of benefits set to the identified broadcast contents, benefits of affiliate companies having a benefit exposure condition satisfying corresponding user information among affiliate companies supporting the identified broadcast contents, and benefits corresponding to preference information of the user among the benefits set to the identified broadcast contents as recommended benefit information.

5. The apparatus according to claim 3, further comprising a history management unit configured to receive connection information for accessing a benefit providing page or benefit use information from the user terminal and managing benefit history of the user.

6. The apparatus according to claim 3, further comprising a broadcast contents database configured to store broadcast contents identification information and an MO identification set for each broadcast contents, wherein the identification unit identifies broadcast contents corresponding to the MO identification by searching the broadcast contents database.

7. A benefit providing method comprising:
receiving an event participation message including an MO identification from a user terminal by a service apparatus via a network,
identifying broadcast contents corresponding to the MO identification, by the service apparatus;
setting recommended benefit information for a user of the user terminal based on the identified broadcast contents or user information of the user, by the service apparatus;
creating a response message including a service connection address for accessing the set recommended benefit information, by the service apparatus;
transmitting the response message to the user terminal, by the service apparatus;
receiving a benefit registration request signal including at least one of identification information of an affiliate company, a benefit to be provided, and a benefit exposure condition from an affiliate company terminal and registering benefit information of the corresponding affiliate company, by the service apparatus.

8. The method according to claim 7, wherein the recommended benefit information is set by at least one of benefits set to the identified broadcast contents, benefits of affiliate companies having a benefit exposure condition satisfying corresponding user information among affiliate companies supporting the identified broadcast contents, and benefits corresponding to preference information of the user among the benefits set to the identified broadcast contents.

* * * * *